United States Patent [19]
Bridgeman

[11] 3,971,953
[45] July 27, 1976

[54] X-RAY TABLE

[75] Inventor: Cecil K. Bridgeman, Islington, Canada

[73] Assignee: Picker X-Ray Mfg. Limited, Ontario, Canada

[22] Filed: Nov. 27, 1974

[21] Appl. No.: 527,750

Related U.S. Application Data

[60] Division of Ser. No. 320,142, Jan. 2, 1973, Pat. No. 3,891,850, which is a continuation of Ser. No. 93,268, Nov. 27, 1970, abandoned, which is a continuation-in-part of Ser. No. 777,943, Oct. 4, 1968, abandoned, which is a continuation-in-part of Ser. No. 657,121, July 31, 1967, abandoned.

[52] U.S. Cl................................ 250/469; 250/444; 250/468
[51] Int. Cl.²......................................... G11B 1/00
[58] Field of Search .......... 250/444, 468, 469, 470, 250/320

[56] References Cited

UNITED STATES PATENTS

| | | | |
|---|---|---|---|
| 2,381,556 | 8/1945 | Powers | 250/469 |
| 3,150,263 | 9/1964 | Catlin | 250/468 |
| 3,553,453 | 1/1971 | Hogan | 250/468 |
| 3,567,931 | 3/1971 | Eelkema | 250/444 |
| 3,569,700 | 3/1971 | Quinn | 250/469 |
| 3,636,351 | 1/1972 | Lajus | 250/469 |

Primary Examiner—Alfred E. Smith
Assistant Examiner—B. C. Anderson
Attorney, Agent, or Firm—Watts, Hoffmann, Fisher & Heinke Co.

[57] ABSTRACT

X-ray table with automatic feeding of radiographic film, and wherein exposed film is directly processed.

21 Claims, 15 Drawing Figures

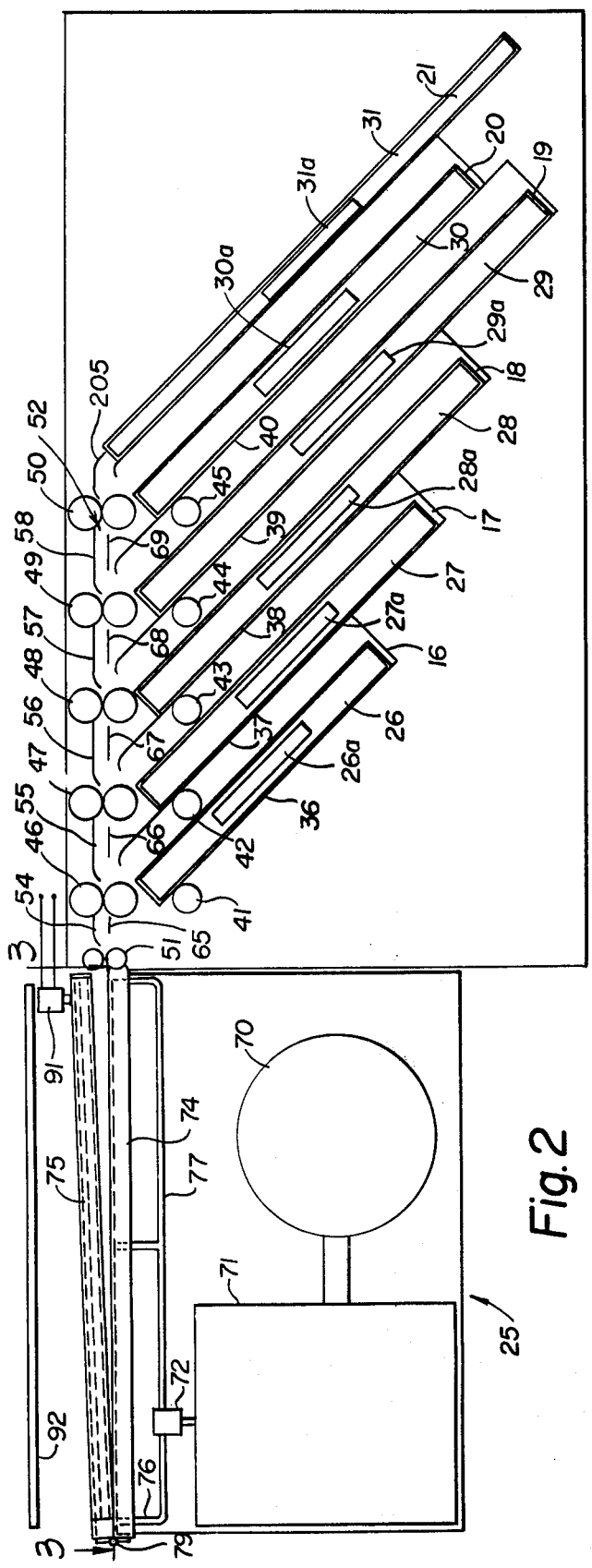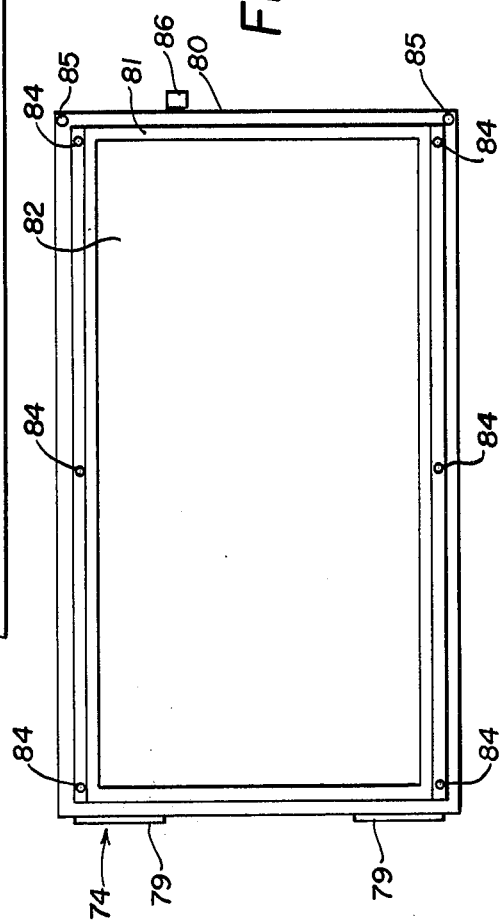

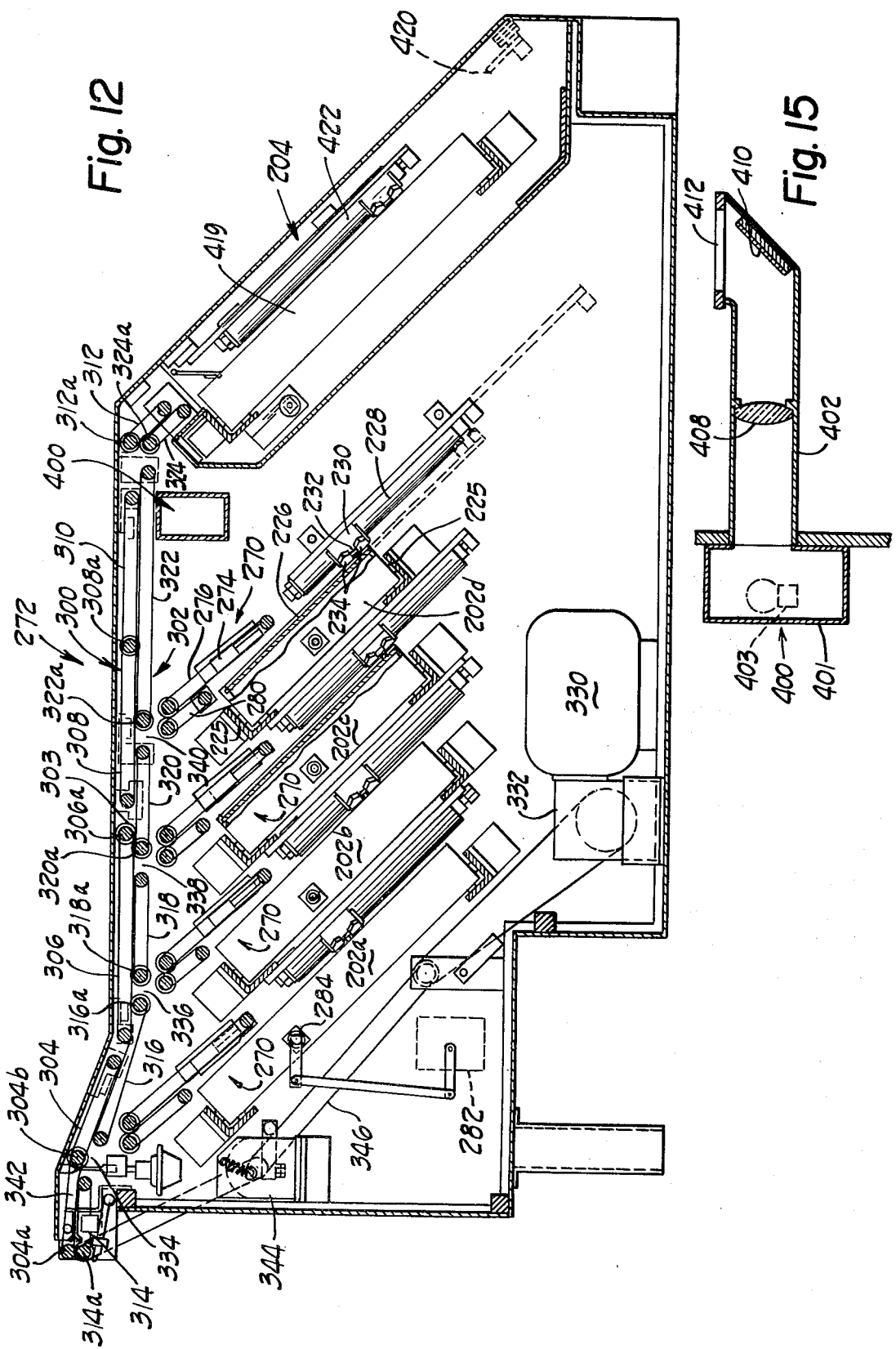

X-RAY TABLE

CROSS REFERENCED PATENTS AND APPLICATIONS

This is a division of application Ser. No. 320,142, filed Jan. 2, 1973, now U.S. Pat. No. 3,891,850, which is a continuation of Ser. No. 93,268, filed Nov. 27, 1970, now abandoned, which is a continuation-in-part of Ser. No. 777,943, filed Oct. 4, 1968, now abandoned, which was a continuation-in-part of Ser. No. 657,121 filed July 31, 1967, now abandoned.

U.S. Pat. No. 2,823,315, entitled X-RAY APPARATUS AND CONTROL, issued Feb. 11, 1958 to R. J. Stava et al.

U.S. Pat. No. 2,887,586, entitled X-RAY FOCUSING APPARATUS, issued May 18, 1959 to Walter Reiniger.

U.S. Pat. No. 3,348,042, entitled FILM PACK, issued Oct. 17, 1967 to Frank H. Umberg et al.

U.S. Pat. No. 3,418,913, entitled FILM PROCESSOR, issued Dec. 3, 1968 to James Snarr.

U.S. Pat. application Ser. No. 93,381 entitled FILM PICKUP SYSTEM, filed Nov. 27, 1970, now U.S. Pat. No. 3,684,276 issued Aug. 15, 1972.

BACKGROUND OF THE INVENTION

1. Field of the Invention

This invention relates to x-ray method and apparatus and more particularly to a novel and improved method of taking radiographs and an apparatus for carrying out the method.

In one typical type of medical diagnostic procedure using radiographs, the patient is positioned on a radiographic table. A light-tight X-ray film cassette which carries the radiographic film is positioned in a tray beneath the surface of the table. An X-ray tube carried on a tower or ceiling-mounted column is then positioned over the patient and aligned with that portion of the patient's body which is to be radiographed. The cassette and its supporting tray are positioned in the path of the X-ray beam and the radiograph exposure is then taken.

2. The Prior Art

With typical prior devices, there have been a number of disadvantages. Most of these disadvantages are inherent in or related to the X-ray film cassettes. As compared with the method and apparatus of the present invention, the cassettes are cumbersome, expensive, time-consuming in use, and of poor reliability.

The typical cassette has a marginal metal frame. One side of the frame, the side to be positioned toward the X-ray source, is closed by a face plate composed of an X-ray transparent sheet. This face plate is secured to the frame in a light-tight manner. The radiographic film is positioned between two fluoroscopic screens known as intensifying screens. This "sandwich" of screens and film is inserted into the cassette and a closure plate is then clamped in position to squeeze the intensifying screens and the X-ray film into tight intimate contact with one another between the face and closure plates. Pressure springs are used to maintain this intimate contact.

These described prior art cassettes have a number of disadvantages. A principal disadvantage is too frequently the necessary intimate contact between the intensifying screens and the radiographic film is lost. This loss of contact may result from a number of causes such as fatigue or improper positioning of the pressure springs. The result is either a poor or a totally unusable radiograph. At times it is necessary to return the patient to the radiographic table and repeat part or all of the radiographic series because of cassette failure.

While the problem of lack of intimate contact between the radiographic film and the intensifying screens has been overcome for many applications with the evacuated cassette structure taught in the above referenced U.S. Pat. No. 3,348,042, the disclosure in that application does not overcome many other disadvantages which are obviated by this invention.

In the referenced application, the technique employed is to insert intensifying screens with a sheet of radiographic film between them and then to evacuate and seal that envelope. It will be recognized that this evacuating technique and the conventional cassette loading techniques described above are relatively difficult and time consuming. Moreover, the loading must be performed in a dark room. Similarly, the unloading of these cassettes is time consuming and must be performed in a dark room.

With prior arrangements the intensifying screens are handled twice for each radiograph, once in the loading and once in the unloading operation. This is not only a factor which contributes to the unnecessary consumption of time with the prior devices but is a further disadvantage because the inevitable result is that these relatively expensive screens have relatively short useful lives.

For a number of reasons, a variety of sizes of radiographs are frequently used. Since a variety of sizes of radiographs are used, it is preferable that a sheet of film be of appropriate size for the exposure. Customarily, a cassette and intensifying screen of a size corresponding to the film size are used. Accordingly, each hospital or X-ray clinic must maintain a substantial inventory of loaded cassettes in or quickly available to each X-ray room. In spite of this, delays are frequently experienced while the operator waits to obtain a cassette of appropriate size or a radiograph is made on an inappropriate size of film. The cassette handling problem is of such magnitude that complicated cassette conveying mechanisms are built integrally into the walls of some new hospitals so that loaded and exposed cassettes can be transported to and from an X-ray room mechanically.

Another problem inherent in the use of any cassette under a radiographic table is the problem of centering the cassette in the X-ray beam. One of the more acceptable prior solutions for this problem is the solution described and claimed in U.S. Pat. No. 2,887,586, issued May 19, 1959, to Walter Reiniger entitled, "X-Ray Focusing Apparatus." With the method and apparatus taught in that patent, a beam of light which coincides with the center of the X-ray beam is projected downwardly onto the X-ray table. The cassette tray is pulled outwardly of the X-ray table and shifted longitudinally of the table until the center of the tray and its cassette is in the path of the beam. The tray is then pushed under the table and a radiograph is taken, but not until an additional procedure is carried out of positioning the anatomical part concerned under the center of the X-ray beam.

Where the cassette is to be positioned centrally of the table, a magnetic centering of the X-ray tube described and claimed in U.S. Pat. No. 2,823,315, issued Feb. 11, 1958, under the title "X-Ray Apparatus and Control" to R. J. Stava et al, solves the problem providing the operator very carefully centers the cassette in the tray under the table. Prior to this invention, however, there has been no mechanism which automatically centers relatively the X-ray source and a radiographic film of a selected one of a plurality of sizes, positioned beneath an X-ray table.

In the past, there have been proposals for feeding film, one sheet at a time, from a storage device to an exposure position and then to an exposed film magazine. These proposals have not been fully satisfactory and have had a number of inherent disadvantages overcome by the present invention. Among these disadvantages have been: (1) The proposed mechanisms were not constructed to assure the necessary complete intimate contact between the intensifying screens and the film under all conditions; (2) No provision was made for using a radiographic film of a selected one of a plurality of film sizes; and, (3) No provision was made for automatically centering an X-ray tube with respect to the film or vice versa.

Since these proposed devices were capable of only using a film of a single size, even when operating properly, they were also unsatisfactory because of the inherent expense in wasting radiographic film. Additionally, the quality of radiographs produced on a mechanism of any such prior proposal was not of a level produced by the method and apparatus of this invention.

SUMMARY OF THE INVENTION

The present invention eliminates the above-discussed difficulties created by the use of film cassettes by completely eliminating the cassettes. The film centering problem is also solved.

With the device of the present invention, a series of film magazines are provided. Each film magazine carries a quantity of film of a selected size with the size of film in each magazine being different than the sizes in all other magazines. A removable magazine for exposed films of all sizes is also provided. In one embodiment of the invention, exposed film is fed directly to a film processor so that handling of exposed film is completely eliminated.

A film positioning structure is provided which includes a pair of relatively movable intensifying screens which are positioned in the path of an X-ray beam. The positioning structure includes a mechanism to shift these screens into clamping engagement with a sheet of radiographic film between then when the sheet of film has been fed to an exposure position between these screens by a film transport mechanism. Preferably the positioning structure includes a vacuum source so that thorough and intimate contact of the screens and film is assured over the entire surface of the film.

When the device of this invention is in use, the operator first selects the size radiograph desired and actuates the transport mechanism. A sheet of unexposed film of the size selected is automatically fed from its magazine to the exposure position between the intensifying screens. The intensifying screens then close on the film and vacuum is applied to assure the intimate contact. In one embodiment of the invention, the X-ray tube is shifted along the table to a position at which the X-ray beam is centered over the location of the center of the film sheet which has been selected.

When the film and beam centers are aligned, the exposure is taken, either automatically or manually. On conclusion of the exposure, the intensifying screens are shifted away from one another and the exposed film is fed to the exposed film magazine.

The contents of the exposed film magazine are periodically taken to a dark room for development. If the dark room is equipped with a film processor having a film feeder of the type disclosed and claimed in the above-identified U.S. Pat. No. 3,418,913, the entire bulk contents of the magazine may be deposited in the automatic film feeder and no further handling of the film is required until the film has been developed and dried.

In one preferred embodiment, a receptacle is provided adjacent the film into which a card bearing film identification may be inserted. The receptacle may be positioned in the path of the X-ray beam with identifying indicia opaque to X-rays being employed. In another embodiment, since the film is sensitive to light, a light flash is used to expose a portion of the film to the identifying indicia on the card.

Another feature of this invention is to provide a faster and easier means of centering the anatomical part to the central ray of the X-ray beam. When a certain film size is selected by push-button control, an illuminated area coincident with the film position and size is outlined by the radiographic shutters. This illuminated area defines the exposure area for the ensuing radiograph. In a table equipped with a movable top, it is now merely necessary to move the table top supporting the patient to the position where the area of the anatomy desired for the radiograph is illuminated. The illuminated area is the same as that which the X-rays pass through.

A further feature of this invention is to provide a means of obtaining a better diagnostic radiograph when using phototiming. With prior mechanism using cassettes, the phototiming pickup has been located either (1) under the cassette where the mass of the cassette filters the X-ray beam and desensitizes it to the point whereby uniformity of exposures on the radiographic film is affected, or (2) the phototiming pickup is located above the cassette which increases the patient-film distance and reduces radiographic quality. With the elimination of the cassette, the phototiming pickup can be located such that it will not increase patient-film distance and will also enjoy full sensitivity of the radiation to given uniform results.

In one embodiment of the invention, exposed film from the magazine is conveyed onto a feeder unit for a processing system. The bulk contents of the magazine can thus be deposited directly into the processor without further handling of the exposed film. Moreover such a system is also operated so that individual sheets of exposed film are immediately processed. Such a "direct processing" operation permits exposure of a film sheet and substantially immediate processing of the film so that the adequacy of the X-ray exposures can be determined while the patient is available for further exposures.

Accordingly, the objects of this invention are to provide an improved method and apparatus for handling, exposing, and processing X-ray film.

Other objects and a fuller understanding of the invention may be had by referring to the following description and claims taken in conjunction with the accompanying drawings.

DESCRIPTION OF THE DRAWINGS

FIG. 2 is an enlarged view of the film supply and transport mechanism;

FIG. 3 is an enlarged view of the mechanism for holding film during an exposure;

FIG. 12 is a vertical cross sectional view of the apparatus shown in FIG. 8;

PREFERRED EMBODIMENTS

Figure 1:
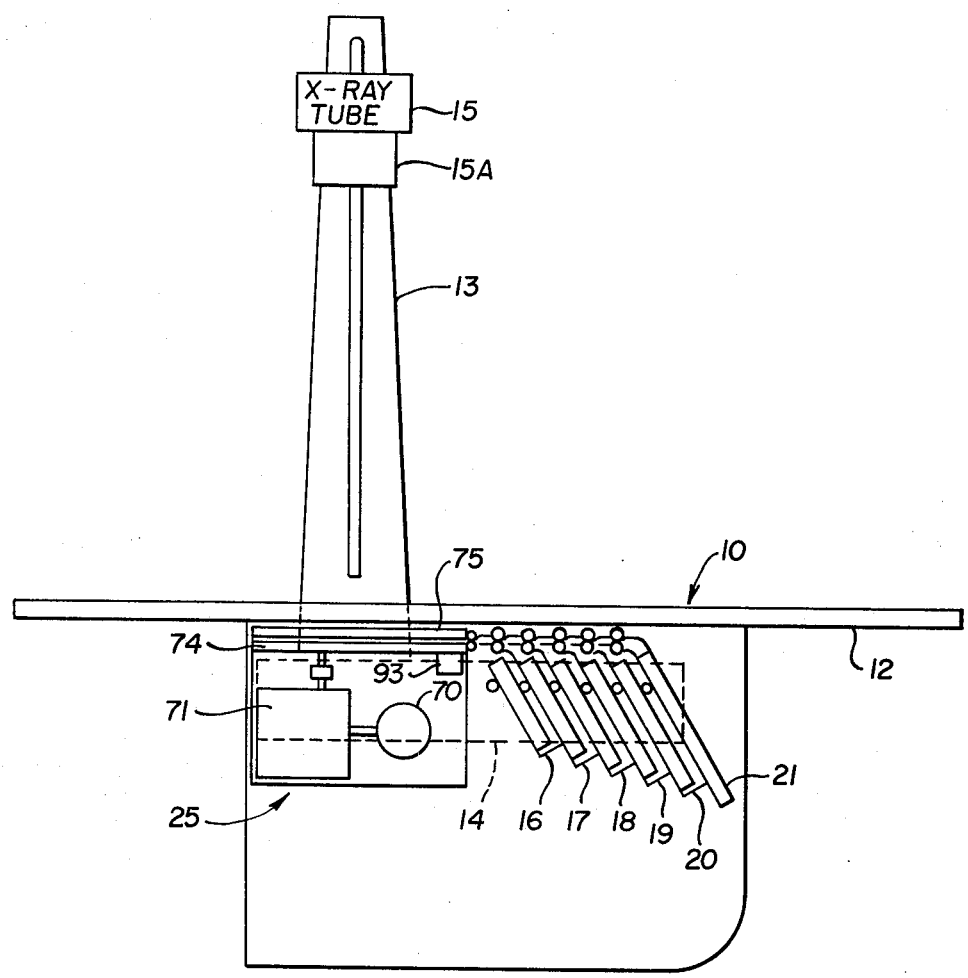
FIG. 1 is a sectional elevation of an X-ray system in accordance with this invention.

In FIG. 1, an X-ray table is shown generally at 10. The table 10 includes a body 11, the front of which is omitted for clarity of illustration. A table top 12 is supported by the body 11. The top 12 is preferably of the type which is movable in its plane relative to the body 11.

A tower or tube stand 13 is mounted on the table body for limited movement horizontally along suitable track structures shown schematically by the dotted lines at 14. An X-ray tube 15 is mounted on the tower for vertical movement toward and away from the table top 12. The tube is equipped with a collimator 15A of the type which includes a light source to provide at appropriate times a visual indication of the size of X-ray field or beam and delineated by the diaphragms of the collimator.

The table body 11 houses a plurality of film supply magazine assemblies identified by the numerals 16–20. The magazine assemblies each house a quantity of bulk film of a different size. Thus, as an example, the supply magazine assembly 16 may house 8 × 10 inch film; the magazine assemblies 17, 10 × 20 inch; 18, 11 × 14 inch; 19, 14 × 17 inch; and the magazine assembly 20, film for chest X-rays. A collection magazine assembly 21 for receiving and storing exposed film is also provided.

A film positioning assembly is shown generally at 25. The film positioning assembly is within the body of the table 10 below the top 12 and in the path of a beam of X-rays emitted by the X-ray tube 15. The positioning assembly 25 receives sheets of X-ray film one at a time from the selected one of the magazine assemblies 16–20 and then positions each sheet of film for a radiographic exposure. After the exposure has been completed, the exposed sheet of film is transported into the collection magazine 21.

Referring now to FIG. 2 in particular, the magazine assemblies 16–21, inclusive, are respectively equipped with drawer-like magazine members 26–31. These magazines 26–31, inclusive, are respectively equipped with handles 26a–31a. The supply magazines 26–30, respectively, may each be constructed to be fully removed and replaced by a duplicate magazine, when the operator wishes to replenish the supply of film of any selected size. Alternately, the magazines may be constructed so that each may be pulled outwardly but not fully removed, and cut film of the appropriate size is then inserted in the magazine to replenish the supply.

In the case of the collection magazine assembly 21, it is desirable that the entire magazine member 31 may be removable as a unit and taken to a dark room for development while a duplicate magazine is positioned in the apparatus to receive film from further exposures. The collection magazine 21 and the film supply magazines 26–30 are preferably suitably equipped with mechanism to selectively make the structures light-tight, when removed from the table body 11 so that the film may be readily transported to the table or from the table to a dark room.

A plurality of film supply guide plates 36–40, respectively, form parts of the supply magazine assemblies 16–20. The film supply plates 36–40 are respectively positioned slightly below and to the left, as viewed in FIG. 2, of the supply magazines 26–30. The film supply magazines 26–30 have apertures adjacent the guide plates 36–40 respectively, so that film sheets may be fed, one at a time, from the magazines. Each of the magazines is equipped internally with suitable structure such as springs to bias a stack of sheets of film within the magazine against the associated film guide plate.

The film guide plates 36–40 are closely spaced from the film supply magazine members 26–30 respectively. The spacing is such that one, but only one, sheet of X-ray film may pass between the two at one time. The film supply magazines 16–20 include film feed rolls 41–45, respectively. The feed rolls 41–45 respectively project through apertures in the film guide plates 36–40 to engage the lower sheet of the associated stack of film sheets contained within the magazine members 26–30 respectively.

A plurality of pairs of film transport rolls 46–50 inclusive are provided. In addition, a pair of film transport and holding rolls 51 are provided immediately adjacent a film exposure space within the positioning assembly 25. The rollers 46–51 inclusive define a film transport path identified by the numeral 52. A series of film deflector plates are positioned above the film transport path 52 and between adjacent pairs of film transport rolls. These deflector plates are identified by the numerals 54–58, respectively. Thus, the deflector plate 54 is between the film transport and holding rollers 51 and the transport roller 46, the deflector plate 55 between the transport rollers 46 and 47 and so forth.

A plurality of film guide plates are positioned below the film transport path and identified by the numerals 65–69 respectively. Thus a guide plate 65 is positioned below the deflector plate 54 in spaced relationship with it to define a portion of the film transport path 52. Similarly, the lower guide plate 66 is below and in spaced relationship with the upper deflector plate 55, the lower plate 67 with the upper deflector plate 56, and so on, to define those portions of the film transport path lying between adjacent pairs of film transport rollers. Each of the guide plates 65–69 inclusive is spaced from the film feed immediately to its left as seen in FIG. 2 to define a film feed slot therebetween.

Referring again to FIG. 2, the film positioning assembly 25 includes a vacuum pump 70. The vacuum pump 70 is connected to a suitable reservoir 71. The reservoir 71 in turn connected to a control valve 72.

A pair of intensifying screen assemblies are indicated at 74, 75. The lower one of the intensifying screen assemblies, 74, is a fixed structure connected by suitable conduits 76, 77 to the vacuum control valve 72. The upper one of the intensifying assemblies 75 is connected by a hinge 79 to the lower assembly.

Referring to FIG. 3, an enlarged top plan view of the lower intensifying screen assembly 74 is shown. It will be appreciated that the upper assembly, apart from the fact that it is movable and does not have vacuum connections, is identical to the lower. Accordingly, to simplify the disclosure, only the lower intensifying screen assembly 74 will be described in detail.

The intensifying screen assembly 74 includes a marginal frame 80. A flexible membrane 81 is secured to the marginal frame 80 closing the opening defined by the frame. The flexible membrane 81 may be of Mylar or other suitable flexible and air-impervious material. Mylar is the trademark of a product sold by the E. I. DuPont de Nemours & Co. The product is the glycol ester of terephthalic acid.

An intensifying screen 82 is carried by the flexible membrane 81. The screen 82 substantially covers the area of the space defined by the frame 80. Intensifying screen 82 is of conventional construction of the type which fluoresces upon energization by X-rays so that the film itself is actually exposed both by light emitted by the two intensifying screens and by direct radiation of the X-rays. The intensifying screen 82 is of a size sufficient to cover the exposure area used with the largest size film used in the device.

A plurality of apertures 84 are shown formed in the frame 80 along its top and bottom sides as viewed in FIG. 3. The apertures 84 are outlets for conduits 76, 77. When the screen assemblies 74, 75 are closed and the valve 72 is open, it will be seen that a vacuum is drawn in the space between the membrane 81 and the corresponding membrane forming a part of the upper assembly 75 so that atmospheric pressure forces the intensifying screens into tight intimate contact with a sheet of film positioned between the assemblies.

Springs 85 are shown near the right-hand end of the frame 80 as viewed in FIG. 3. As seen in FIG. 2, the springs 85 are between the assemblies 74, 75 to bias the right-hand side of the upper assembly 75 upwardly away from the lower fixed assembly 74. When a film has been positioned between the assemblies 74, 75 in a manner which will be described in greater detail below its trailing edge is sensed by a limit switch 86, FIG. 3. The limit switch causes the feed of the film to stop and a solenoid 91, FIG. 2 to energize to close the assemblies 74, 75.

It is customary in X-ray exposures to provide a grid of lead bars which minimizes blurring of the radiograph by so-called scatter radiations. The structure indicated schematically at 92 in FIG. 2 represents a suitable oscillating grid known as a Bucky grid positioned between the patient and the film.

Figure 4:
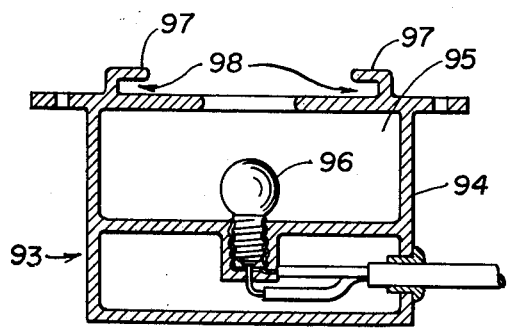
FIG. 4 is a side view taken in section of a portion of the compartment including a card holder.

Referring to FIG. 1, an identifying card holder is shown schematically and generally at 93. For clarity of illustration, the card holder 93 has been eliminated from FIG. 2. In FIG. 4, an enlarged sectional view of the holder is shown. It comprises a frame 94 which defines a light space 95 in which a light bulb 96 is positioned. Upper flanges 97 project above the remainder of the frame 94 to define slots 98 into which a card bearing identifying indicia may be positioned. Prior to taking of a radiograph, an identifying card is inserted into the slots 98. During exposure, the light bulb 96 is illuminated so that the indicia on the card is reproduced on the radiograph being taken.

The Control Circuit

Figure 5:
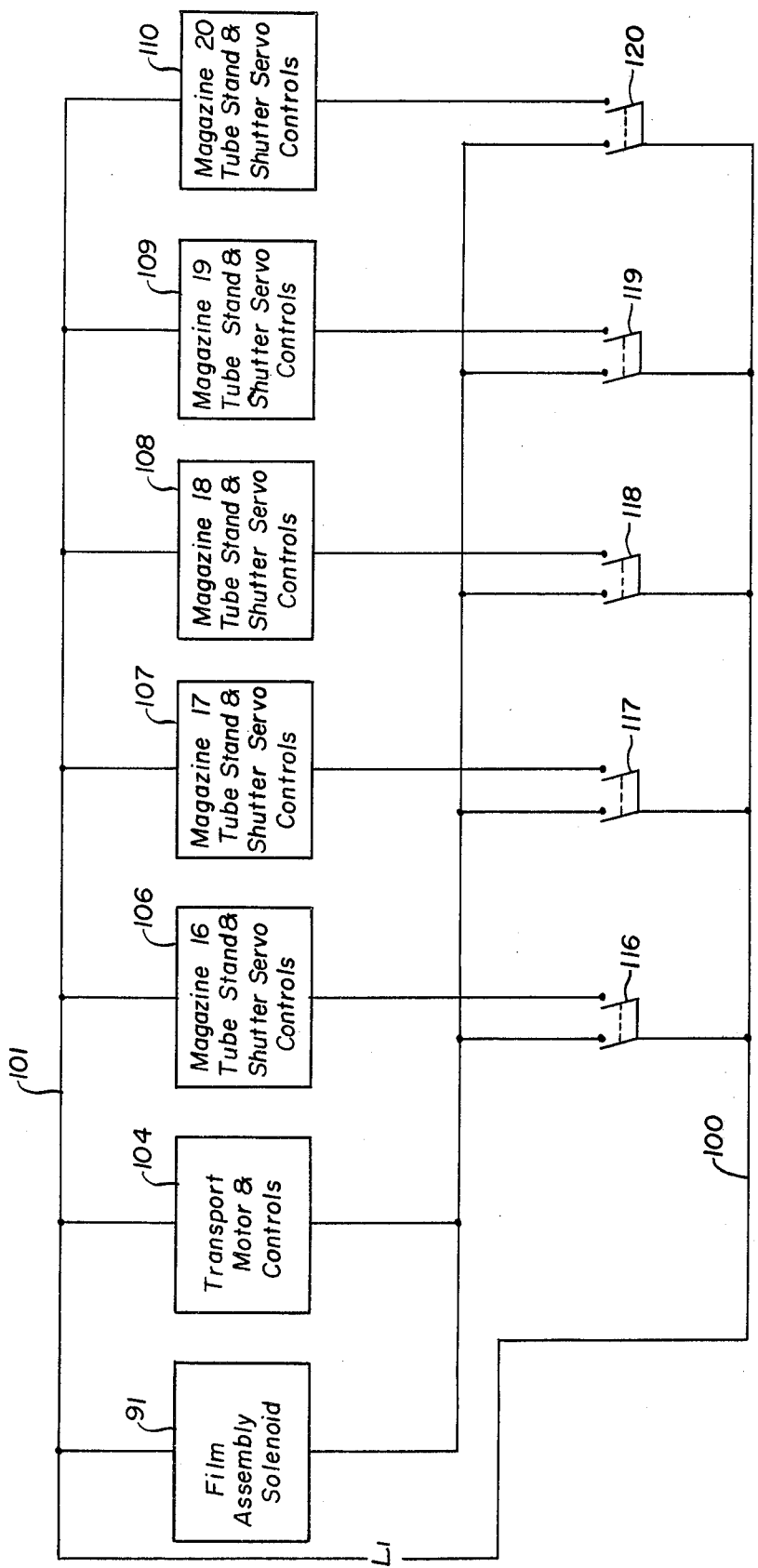
FIGS. 5 and 6 are schematic circuit diagrams of a control circuit which may be used in an embodiment of this invention; and, FIG. 7 is a sectional elevational view of another X-ray system according to the invention.

FIG. 5 is a schematic block diagram of a circuit for controlling the film transporting system and the automatic tower or tube stand and shutter controls. A pair of conductors 100, 101 are connected to opposite sides of a source of voltage L-1. The blocks in the FIG. 5 diagram represent respectively the film solenoid 91, a film transport motor and its controls 104, a control for the feed of film from magazine 16 and related tube stand and shutter servo-controls 106 and corresponding magazine, tube stand, and shutter servo-controls 107, 108, 109, 110 for the magazines 17–20, respectively. The devices are represented schematically by the blocks 91, 104, and 106–110 inclusive, which are each connected to the conductor 101 and thence to one side of the line L-1.

A plurality of double-pole selector switches 116–120 inclusive are provided. The switches 116–120 are connected to the conductor 100 and thence to the other side of the line L-1. One pole of each of the switches 116–120 energizes the assembly solenoid 91 and the film transport motor and controls as will be described more fully presently. The assembly solenoid 91 and the transport motor and controls 104 are each controlled by the limit switch 86, not shown in FIG. 5, but shown in FIG. 6 in connection with which it will be described more fully.

Each of the second poles of the switches 116–120 is connected to the associated magazine tube stand shutter and servo-controls for the magazines 16–20. Since the magazine feed and the tube stand and shutter controls represented by the blocks 106–110 respectively are substantially identical, only the block 107 will be described in detail in connection with FIG. 6.

Figure 6:
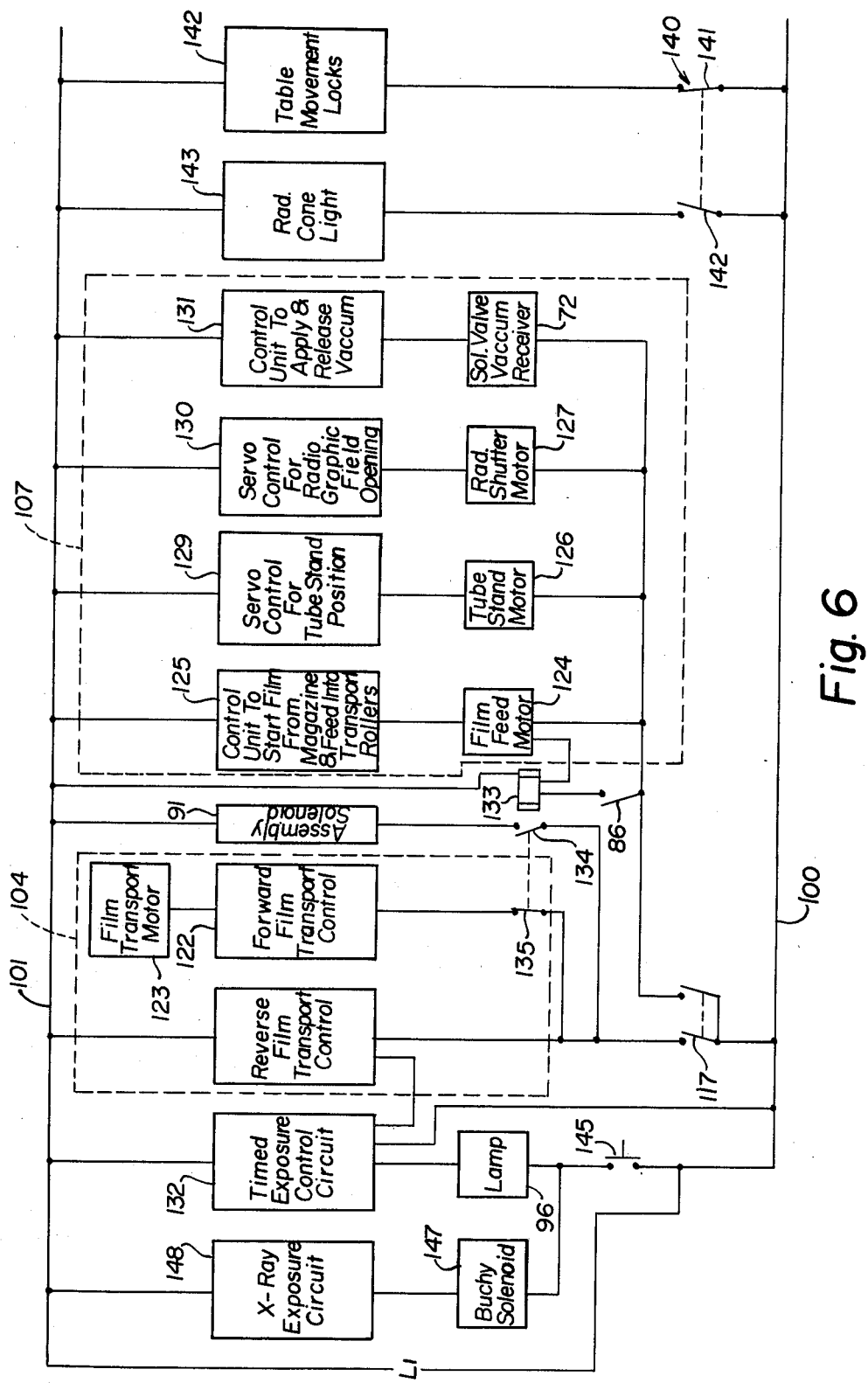

Referring to FIG. 6, when the switch 117 is closed, its first pole energizes a forward film transport motor control 122. This control energizes and controls a film transport motor 123 in a forward direction. Energization of the film transport roller in a forward direction causes the pairs of rollers 46–51 inclusive to rotate in such forward direction. Simultaneously, the other of the poles of the switch 117 accomplishes several functions.

One of these functions is energizing a film feed motor 124 which is connected to the film feed roller 42. This forward rotation of the film feed roller 42 continues long enough to strip a sheet of film from the magazine 17 and feed it upwardly until it strikes the film deflector plate 55 and is deflected between the feed rolls 46. Subsequently as by response to actuation by a limit switch or a time control, the film feed motor control 125 stops the operation of the film feed motor 124.

The closing of the switch 117 also energizes a tube stand motor 127 and a shutter positioning motor 127. The tube stand and shutter positioning motors 126, 127 are respectively controlled by tube stand and shutter servo-controls 129, 130. The tube stand motor is energized a sufficient length of time to automatically center the tube stand 13 for the selected radiographic size from the magazine 17, 10 × 12 inches in the examples given. Similarly, the servo-motor 127 is energized to automatically adjust the shutters in the collimator 15A to a field size appropriate for the selected 10 × 12 film size.

The closing of the switch 117 also energizes the vacuum control valve 72 to apply vacuum to the space which will receive the film, preferably after a suitable time delay controlled by a vacuum control unit 131. A time delay will allow the selected sheet of film to be transported into the exposure position. It can readily be recognized that the limit switch 86 can be used for signalllying the vacuum control unit 131 to turn on signalling vacuum. Thus, the time delay will be proportional to the time actually taken by the film to feed into the exposure position and vacuum will be applied immediately upon the arrival of the film to its exposure position. Further, the vacuum control unit 131 is preferably connected, although not shown on the diagrammatic drawing, to the exposure control circuit 132. Thus, on completion of the exposure, a signal from the exposure control 132 will be transmitted to the control unit 131 causing it to be deenergized. In fact, the exposure control unit can be connected into the entire circuit to take over all functions of the switch 117 so that it may be released once the exposure is started.

As has been indicated previously, when the trailing edge of the film reaches its exposure position, the limit switch 86 is actuated. This energizes a solenoid 133. The solenoid 133 closes a switch 134 to energize the film assembly control solenoid 91. In the disclosed embodiment, it also opens a switch 135 in the forward film transport control to stop the feed of the film.

A switch, which may be a foot switch 140, is provided. The switch 140 has a normally closed contact 141. When the contact 141 is opened, magnetic locks which control table movement and are indicated by the block 142 are deenergized allowing the table top to be moved to position the patient. A normally open contact 142 of the switch 140 is closed to energize a light indicated at 143 in the collimator 15A to illuminate the selected field size and facilitate positioning of the patient. Once the patient is properly positioned, the switch 140 is released, deenergizing the light 142 and reenergizing the magnetic locks.

At this time, the exposure control switch 145 may be depressed. This energizes the bulb 96 for exposing the identifying indicia on the film and it also initiates the action of the exposure timer circuit 132.

The exposure control switch 145 also actuates a Bucky solenoid 147 to energize the Bucky grid shown schematically at 92 in FIG. 2. It of course also energizes the X-ray exposure circuit 148 so that the radiograph is taken.

Figure 7:
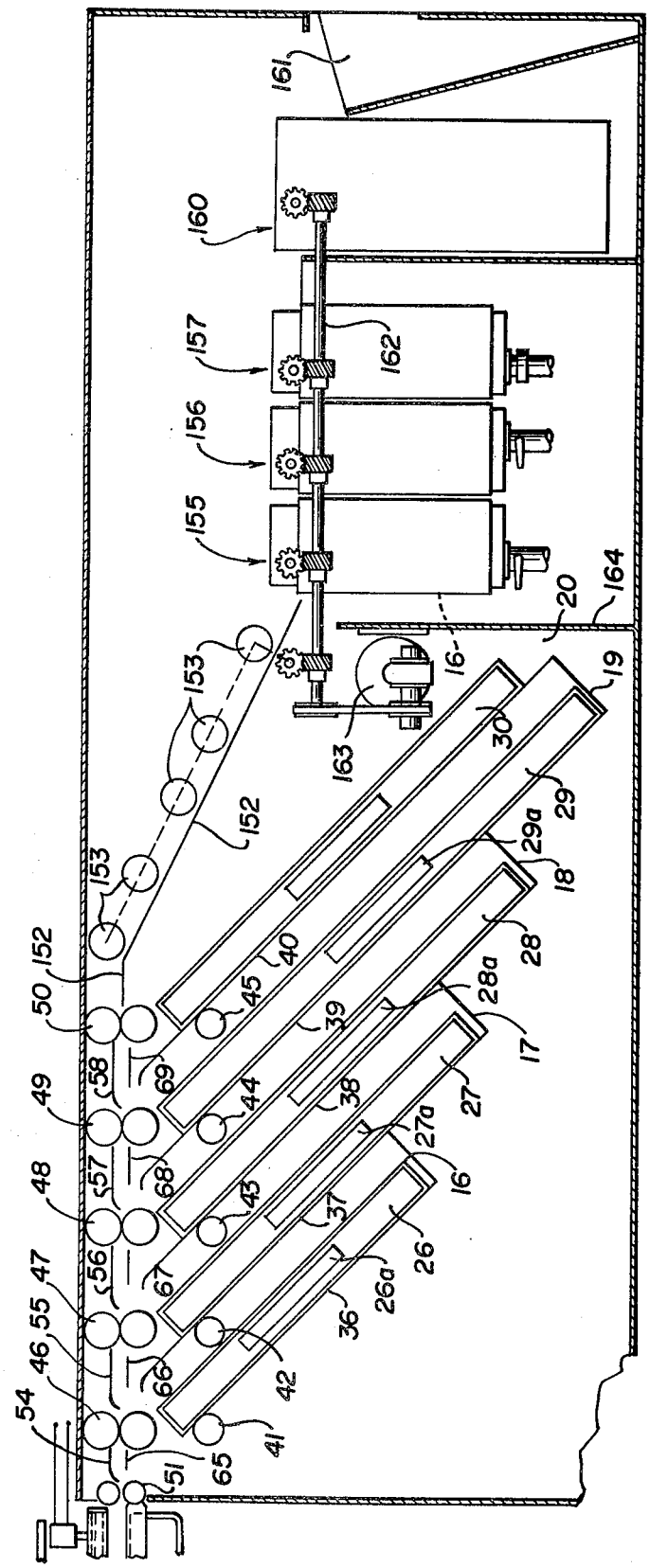
Figure 8:
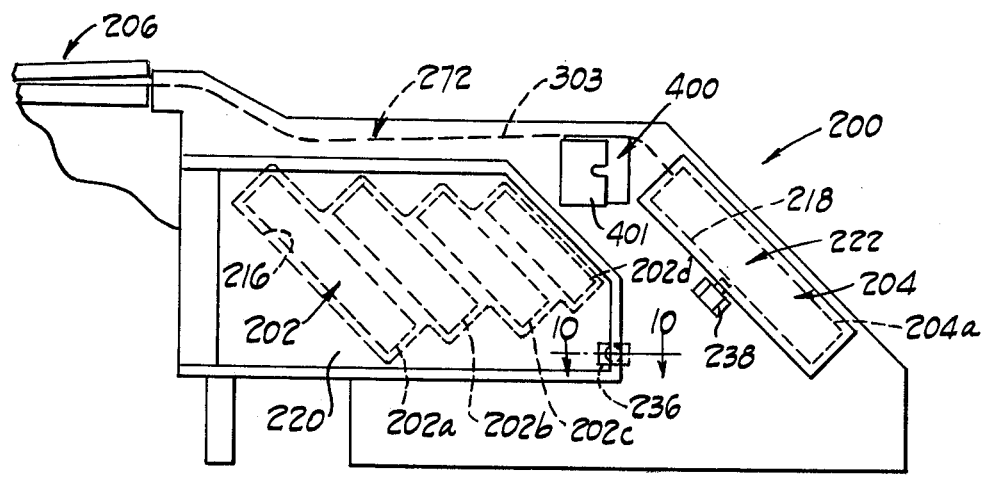
FIG. 8 is an elevational view of part of a modified film supply and transport mechanism constructed according to the invention.

FIG. 7 illustrates a modified X-ray table 10' having a film processor 150 included in the system. The processing unit 150 is of the type which is illustrated and disclosed in the above noted U.S. Pat. No. 3,418,913. Accordingly, the processor is briefly described and reference should be made to the noted application for a fuller understanding of the details of construction of the processor 150, if desired. The table 10' permits individual exposure to be directly processed while the patient is available for further X-rays. Alternatively, the contents of the film magazine can be accumulated by a suitable elevator tray associated with the processor for processing at one time when desired. With the exception of the processor 150 and parts associated with it, the table 10' is the same as the table 10 described above, and similar parts are indicated by like reference characters.

The table 10' includes the storage magazines 16–20 and associated equipment as described above, and a film transport structure in the form of rolls 46–50 for delivering film from a magazine to the film positioning assembly 25. Since the film positioning assembly 25 and the associated X-ray equipment is the same as described above in reference to FIGS. 1–6, this portion of the table 10' has been shown only in part in FIG. 7.

The body 11' of the table 10' is modified to permit incorporation of the processor 150. Exposed film is directed from the assembly 25 to the processor unit by the film transport structure. The processor 150 includes a film feed assembly 151 removably supported between side walls of the body 11'.

The feed assembly 151 includes a guide 152 and delivery rolls 153 through which film is directed into a developer tank 155. The developer tank 155 includes a suitable film transfer mechanism which passes individual sheets of film through the solution in the tank 155 and directs the film into a fixing tank 156 immediately adjacent the developing tank.

The fixing tank 156 includes film transfer mechanisms for directing the film received from the developing tank through the solution in the fixing tank. Film which is passed through the fixing tank 156 is fed from the fixing tank into a wash tank 157 disposed adjacent the fixing tank.

The wash tank 157 also includes a mechanism for transporting the film through the wash tank and for transporting the film from the wash tank into an automatic film dryer 160 also disposed within the body 11' and positioned adjacent an access opening 161.

The feed rolls and the film transfer mechanisms in the tanks 155–157 and dryer 160 are geared to a common drive shaft 162 extending longitudinally in the body 11'. The drive shaft 162 is driven from an electric motor 163 through a conventional belt transmission. The motor 163 and belt drive are mounted within the body 11 on a suitable supporting frame member 164.

Controls for the processor 150 are suitably disposed in a control panel of the housing 11' for easy accessibility by an operator of the X-ray table 10'. The tanks 155–157 are associated with suitable plumbing for supplying appropriate processing solutions to them. The plumbing may be conventional and has not been illustrated.

It should be appreciated that the housing 11' surrounding the magazines and processing unit 150 is a light-tight construction which prevents the entrance of light into the housing when the unit is operating. From the above description, it should also be apparent that the processor unit 150 can be operated to immediately process a sheet of exposed film as soon as that sheet of film is exposed and transported to the processor 150. Hence, a developed sheet of film is available for viewing by the operator in a relatively short time after the exposure is made and while the patient is available for further exposures.

The Apparatus Of FIGS. 8–15

FIGS. 8–15 show another modified table body 200 constructed according to the invention. The table body 200 is associated with a table 12 and X-ray tube stand or tower 13 which are not illustrated in FIGS. 8–15. The table body 200 includes an unexposed film storage magazine generally designated at 202, an exposed film storage magazine 204, a film positioning assembly 206 (shown only in part) and a film transport system 208 for transporting film from the unexposed film storage magazine 202 to the film positioning assembly 206 and thereafter from the film positioning assembly 206 to the exposed film storage magazine 204.

The table body 200 defines a light tight enclosure for the film magazines which can be opened for removal and replacement of magazines and/or film. The body 200 includes side frames 214, 215 and top, bottom and end closure plates (not numbered). The side frame 214 defines access openings 216, 218 each closable in a light tight fashion by respective doors 220, 222. When the doors 220, 222 are closed, film can be transported about within the body without being exposed.

The Film Storage Magazines 202, 204

The exposed and unexposed film magazines 202, 204 each includes film storage members 202a–d and 204a, respectively. The storage members 202a–d each receive a stack of sheets of film of a given size. The film sheets in each stack are of a size different than the sheets in the other stacks. Accordingly, the members 202a–d are of different sizes.

These members are all centered in a vertical plane 205 extending parallel to the side frames so that each sheet of film in the magazine 202 has its centerline aligned with the centerlines of the other film sheets in the magazine. The exposed film magazine member 204a is likewise centered in the plane 205. The plane 205 passes through the film positioning assembly and through the center of the X-ray beam which is emitted from the tower 31. The film storage members are each essentially the same and therefore only the member 202d is described in detail for purpose of illustration. (See FIG. 12).

The member 202d is a drawer-like film receptacle which can be slid into and out of the access opening 216 when the door 220 is open. The drawer 202d is supported on slides 225 formed by suitable angle irons which extend between the side frame members. The slides 225 enable the member 202d to be slid in and out of the access opening. The drawer 202d carries a closure member 226 which is slidable back and forth over the top of the drawer in guide slots formed at the open side of the drawer. The interconnection between the drawer and its closure 226 is light tight when the closure 226 extends across the top of the drawer.

The closure 226 is moved between open and closed positions by an actuator 228. The actuator 228 is preferably a piston and cylinder actuator of the single acting type which is connected to the vacuum source 70 (not shown in FIG. 8) for the film positioning assembly. The actuator has a bracket 230 carried by a piston rod for movement with the piston rod relative to the associated drawer 202d. A knob 232 projects from the associated closure 226 and is received between fingers 234 on the bracket 230. The fingers 234 extend parallel to each other from the bracket 230 towards the access opening 216. A spring normally urges the piston and associated bracket 230 to a position in which the closure 226 is in the open position. When the actuator is communicated with the vacuum source it moves the closure 226 to the closed position. The drawer can then be slid through the access opening with the knob 232 moving from between the fingers 234. When the drawer is reinserted, the knob 232 slides between the fingers 234 again so that the closure 226 can be operated by the actuator.

Figure 11:
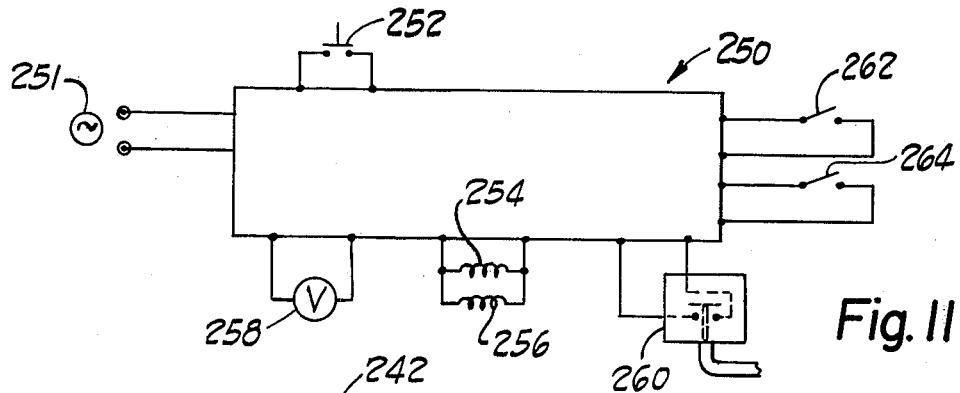
FIG. 11 is a schematic view showing circuitry associated with the apparatus of FIG. 8.
Figure 10:
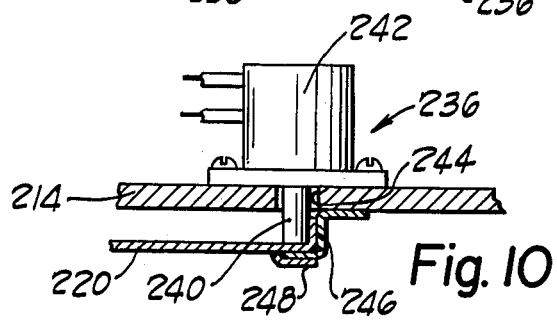
FIG. 10 is a cross sectional view seen from the plane indicated by the line 10—10 of FIG. 8.

The doors 220, 222 are latched in the closed position and can be opened only when all of the magazine drawers have been closed. The doors are provided with solenoid latch devices 236, 238, respectively, for maintaining the respective doors locked when the magazine covers are opened. Each of the solenoid latch devices is substantially the same and FIGS. 10 and 11 illustrate an example of a latch device and its mode of operation. As shown in FIG. 10, the latch 236 includes an armature member 240 which is movably disposed in a coil assembly 242 screwed to the side frame 214. The armature 240 moves through a hole 244 in the side frame and into latching relationship with a lip 246 on the door 220 which forms part of a light trap 248 extending around the door. When the armature 240 is in the position shown in FIG. 10, the door 220 is locked. When the solenoid coil is energized the armature 240 is withdrawn from the door lip and the door 220 can be slid to its open position.

The solenoid latches 236, 238 form part of a control system illustrated in FIG. 11 which governs operation of the latches 236, 238 so that the doors 220, 222 cannot be opened through inadvertence and cause film in the body 200 to be exposed. The control system includes a control circuit 250 connected between a suitable power supply 251 and the coils 254, 256 of the latches 236, 238, respectively. When it is desired to open either the door 220 or the door 222, a push button switch 252 is depressed. Momentarily closing the contacts of the push button switch 252 energizes an electrically operated valve 258 which communicates the actuators 228 to the vacuum source. This closes the drawers of the exposed and unexposed film magazines 202, 204. When the actuators are each in the drawer closed condition, the vacuum in the system increases. This increase in vacuum closes a vacuum pressure sensing switch 260 associated with the control circuitry. The pressure switch 260 closes and enables energization of both coils 254, 256 so that the doors are unlocked. The circuitry 250 also includes a time delay arrangement (not shown) which deenergizes the coils 254, 256 and resets the circuit 250 if neither door is opened within a predetermined period after the pressure switch 260 closes.

Door switches 262, 264 are associated with each of the doors 220, 222, respectively. If either door is opened during the timing period, its associated door switch is closed to close a holding circuit for the coils 254, 256. So long as either door remains open, the solenoid coils 254, 256 remain energized. When the doors are closed, the door switches 262, 264 are opened and the circuit 250 promptly resets, locking the doors.

The Film Transport System 212

Referring again to FIG. 12, the film transport system 212 comprises a plurality of film pickup units 270, each associated with a respective unexposed film magazine, and a film conveyor unit 272 for transporting sheets of film one at a time from one of the pickup units 270 to the film positioning assembly and thereafter transporting the exposed sheet of film to the exposed film magazine 204 for storage.

The pickup units 270 function to pick up a single sheet of film by vacuum pressure and advance the film sheet to the film transport system. The pickup units each include three vacuum manifolds 274 which are disposed above a respective magazine drawer. The manifolds 274 are associated with a belt drive unit 276 having three perforate belts one of which extends over each manifold 274. A cooperating belt drive unit 280 is associated with each belt drive unit 276 for advancing film from the vacuum manifold. The belts of the belt drives 276, 280 have confronting engaged reaches which grip a sheet of film for positively advancing the sheet in the direction of movement of the belts.

The stack of film sheets in a given magazine drawer is elevated into engagement with the associated belt drive 276 by an actuator 282. Only one actuator 282 is shown in FIG. 12 associated with the drawer 202a. The actuator 282 is preferably vacuum operated and raises the stack of film sheets by turning a shaft 284 extending through the drawer. The actuators are connected to the vacuum source for the film positioning assembly (the source is not shown in FIGS. 8–15). The shaft 284 rotates and raises a film stack support in the drawer so that the top sheet of the stack engages the belt drive 276. The top film sheet "sticks" to the belt drive 276 due to the differential pressure applied across the sheet.

The actuator 282 is then deenergized so that the film stack drops away from the belt drive 276 leaving only the top sheet clinging to the perforate drive belts. The belt drives 276, 280 are then operated so that the sheet is fed between the belt drives 276, 280. The pickup units are illustrated and described in greater detail in the above cross referenced application Ser. No. 93,381, filed Nov. 27, 1970, now U.S. Pat. No. 3,684,276, issued Aug. 15, 1972.

The film transport unit 272 receives a film sheet from one of the pickup units 270. The unit 272 comprises an upper conveyor system 300 and a lower conveyor system 302 which establish a path of film travel 303 between them so that sheets of film are conveyed one at a time from one of the pickup units 270 along the path of film travel 303 to the film positioning assembly 206 for exposure and thereafter are conveyed from the film positioning assembly 206 to the exposed film magazine 204.

The upper conveyor system 300 comprises belt units 304, 306, 308, 310 and 312. Each of these belt units includes drive shafts 304a, 304b, 306a, 308a, 312a. The belt units 308, 310 are each driven from the same drive shaft 208a. The drive shafts each extend between the side frames of the body 200. Each shaft has at least two belts frictionally engaged with it so that when the shaft is rotated the belt trained around it is moved.

Each of the belt units also includes an idler shaft or shafts. These shafts are supported between the side frames and are freely rotatable when the belts move. The idler shafts are unnumbered and are shown in cross section in FIG. 12.

The lower conveyor system 302 comprises belt units 314, 316, 318, 320, 322 and 324. Each of these units includes a drive shaft 314a, 316a, 318a, 320a, 322a, 324a, respectively, and idler shafts which again are not numbered. Each drive shaft extends between the side frames and is driven to drive the associated belts with it.

Figure 9:
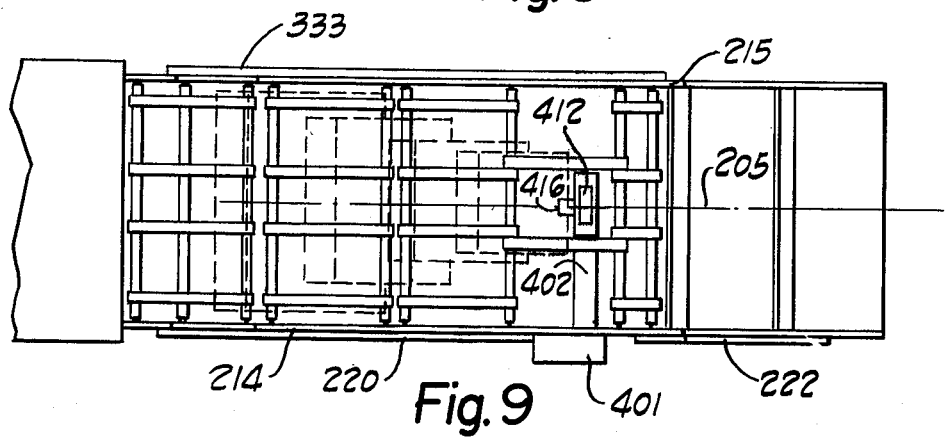
FIG. 9 is a top plan view of the mechanism of FIG. 8.

The belt units are driven from a reversible electric motor 330 via a gear reduction 332 and a chain transmission 333 (shown schematically in FIG. 9). The belt unit 304 is separately driven from the motor 330 in a manner which is described in greater detail presently.

All of the belt units except that units 310 and 322 comprise four belts which extend parallel to each other along the path of film travel 303. Two of these belts are located on each side of the plane 205. The units 310 and 322 each comprise only two belts which are located on opposite sides of the plane 205.

Adjacent belt units in the lower conveyor system 302 are spaced apart to define conveyor entryways 334, 336, 338, 340 between adjacent belt units. The entryways enable single sheets of film to move into the path of film travel 303 between the confronting belts of the upper and lower conveyor systems from any given one of the film pickup units 270. Since belt units of the upper conveyor unit 300 bridge the entryways and the film entryways are substantially in line with the conveyors 276, 280 of each of the pickup units 270, a sheet picked up by a unit 270 moves with dispatch onto the film path of travel.

The conveyor 272 advances the film along the path 303 to the exposure station. When the film moves into the film positioning assembly the trailing edge of the film moves through the belt units 304, 314 and actuates a switch 342 adjacent the shafts 304a, 314a. Actuation of the switch 342 immediately stops the belt units 304, 314 so that a marginal portion at the end of the film sheet remains gripped between the shafts 304a and 314a while the remainder of the film sheet extends into the film positioning assembly.

In the preferred embodiment, the film operated switch 342 is electrically coupled to a solenoid actuated clutch-brake unit 344 which is connected between the gear reduction 332 and the belt units 304, 314 by a chain drive 346. The clutch-brake unit 344 is actuated by the switch 342 so that the drive to the belt units 304, 314 is declutched and motion of the belt unit 304, 314, are braked to an immediate halt. Continued gripping of the film by the shafts 304a, 314a of these belt units is thus assured. Preferably all but about a 1 inch long marginal edge of a sheet of film extends into the film positioning assembly for exposure.

Figure 13:
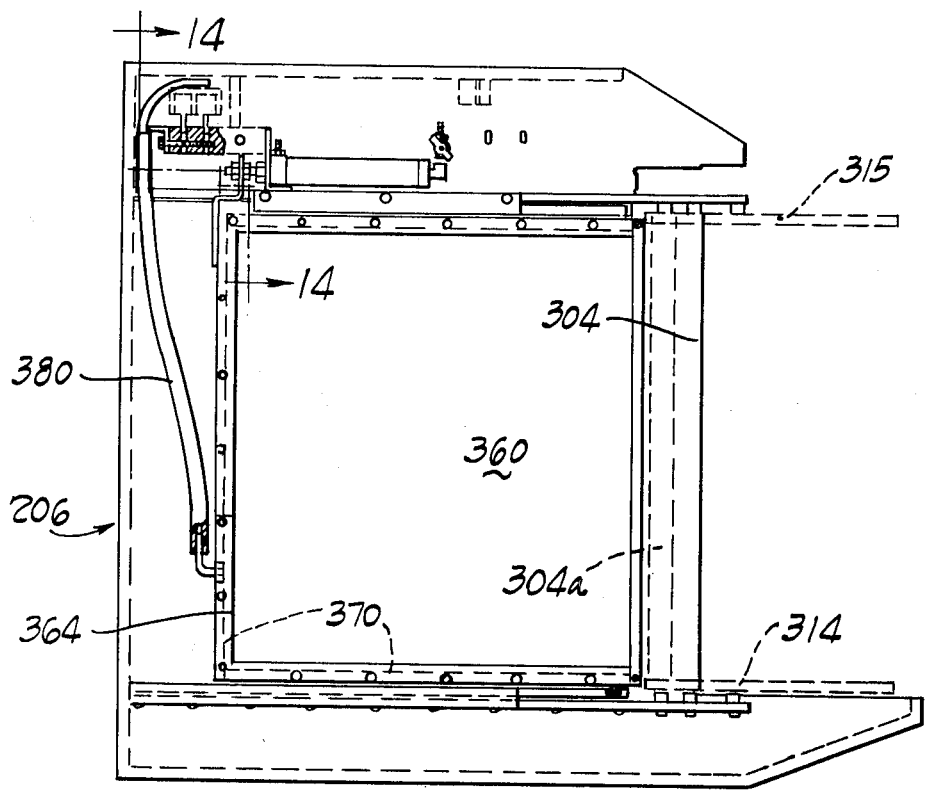
FIG. 13 is a top plan view of a film positioning assembly used with the apparatus of FIG. 8.
Figure 14:
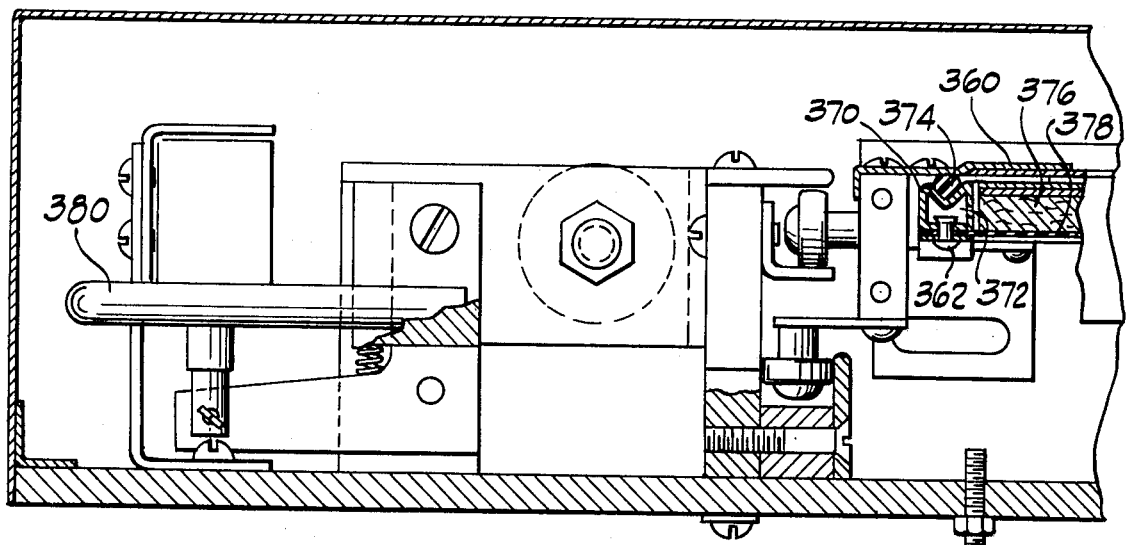
FIG. 14 is a cross sectional view seen from the plane indicated by the line 14—14 in FIG. 13; and, FIG. 15 is a cross sectional view seen from the plane indicated by the line 15—15 of FIG. 12.

A film positioning assembly constructed according to the invention is illustrated in FIGS. 13 and 14. The film positioning assembly 206 includes a pair of generally rectangular film supporting members 360, 362 the top one of which is pivoted at its end 364 remote from the conveyor 272. The film support 360 is raised about its pivot to separate the film support for reception of a sheet of film between them.

When a sheet of film is fed between the supports 360, 362 the film support member 360 is moved down into tight engagement with the film support 362, and a vacuum is drawn between them so that the film is securely positioned between the film supports and an intimate contact with the image intensifiers carried by the film supports as described above in reference to FIGS. 1 and 2.

FIG. 14 shows a cross sectional segment of the film support members in the engaged positions. The lower film support member 362 includes a peripherally extending vacuum manifold member 370 having ports 372 opening through its inner periphery. A sealing element 374 is carried atop the manifold 370 for engagement with the upper film support member 360 when that member is lowered. When the film support members are engaged, the seal 374 is compressed between them about their peripheries so that a vacuum is easily drawn between the film support members via the ports in the manifold 370. The seal 374 is sufficiently deformable that it seals tightly about the film sheet extending into the members from the film conveyor.

The lower film support 362 includes a rectangular body 376 of supple fibrous material and a resilient flexible diaphragm member 378 supporting the body 376 and forming a bottom closure of the film support. When a vacuum is established between the film support members, the diaphragm 378 is flexed upwardly by the pressure differential across it so that the film sheet between the film support members is tightly and firmly engaged between the image intensifiers in full face contact with them. A vacuum hose 380 for connecting the manifold member to the vacuum source is illustrated in FIG. 13.

When the exposure is completed the vacuum between the film support members is vented and the member 360 is raised and the film transport system 272 is operated to move the film along the film path of travel 303 toward the film storage magazine. The film sheet is withdrawn from the film positioning assembly by the shafts 314a, 304a which tightly grip the marginal portion of the film at the conclusion of the exposure. The belt units then move the film sheet along the film path of travel 303 towards the exposed film magazine 204 opposite to the direction in which the film approached the film positioning assembly.

The unexposed marginal portion of the film sheet has identifying indicia projected onto it as the film sheet moves to the exposed film magazine. A camera unit 400 is supported by the table body for this purpose (see FIGS. 8, 9 and 15). The camera unit 400 includes an indicia card supporting housing 401 attached to the side frame 214 and a light guiding pipe 402 extending through the side frame to a location below the path 303 and in the plane 205. The housing 401 defines a narrow slot through which an indicia bearing card is slid. The slot is sufficiently narrow that minimal amounts of light enter it. The housing 401 also supports an electronic photoflash or flasher unit 403 of conventional construction and which is schematically shown as a bulb in the drawings.

A lens 408 and a mirror 410 are disposed in the pipe 402. The light pipe 402 defines a narrow rectangular aperture 412 extending in a horizontal plane just below the path 303, and which is symmetrical about the vertical plane 205. When a card in the housing 401 is illuminated by the flasher unit the image of the card is focused by the lens 408 and projected onto the unexposed marginal portion of a film sheet above the aperture 412.

In the preferred construction, the flasher unit is controlled by a switch 416 which in turn is operated in response to movement of a film sheet to a position over the aperture. The switch 416 has an operating arm which is actuated by the film sheet when the unexposed marginal portion of the film is over the aperture. The camera unit 400 preferably operates with sufficient speed that the film need not be slowed for exposing the marginal portion.

It should be noted that the light produced by the flasher unit is only sufficient to produce an image on the unexposed portion of the film which is proceeding along the path of film travel 303. This light has no effect on the remaining film within the table body 200.

The film sheet which has been exposed and identified by the camera unit 400 proceeds into the collection or exposed film magazine 204 via the belt units 312, 324. The exposed film magazine drawer 419 is substantially like the drawers of the unexposed film magazine described above except that the film stack supporting and elevating mechanisms are omitted. The light tight drawer closure member 420 and actuator 422 for the closure member are substantially the same as described above. When the film sheet has been deposited in the exposed film magazine, the apparatus is reset for a subsequent exposure.

To operate the unit 200, a patient is placed on the table and the table is shifted to position the patient's body with a part to be examined centered over the film positioning assembly 206. The size sheet of film desired for exposure is determined and selected by depressing a corresponding push button on a control panel (not shown). Depressing the push button enables operation of a film pickup unit 270 associated with the magazine drawer containing the desired size film sheets and conditions the transport system and film positioning assembly for operation.

Thereafter an "Advance" button on the control panel is depressed. This operates the selected film pickup unit 270 which picks up a film sheet from the selected magazine. When a sheet has been picked up, this fact is appropriately sensed and the film transport system is then operated to advance the film sheet into the film positioning assembly. The film sheet enters the film positioning assembly and its presence is sensed so that the film supporting frame members are actuated to hold the film in place for an exposure.

If a sheet is not picked up, the film transport system will not operate and an X-ray exposure of the patient without film in position cannot be made. If, after the film sheet is in the exposure station, it is determined that a different sized sheet of film should be used, the operator depresses a fiom selector button corresponding to the newly desired film size. Depression of the second film size selector button results in opening the film positioning assembly and operation of the film transport system to deliver the originally selected unexposed film sheet to the collection magazine 204. Thereafter the "Advance" button is depressed to move the newly selected film sheet to the film positioning assembly for exposure.

An exposure is made by pressing an "Expose" button on the control panel. This operates the X-ray tube after which the film positioning assembly automatically opens and the film transport system delivers the exposed film to the collection magazine. The exposed film sheet is identified by the camera unit 400 as it moves to the collection magazine.

The control panel also contains the push button switch for controlling operation of the access doors 220, 222. When it is desired to replenish the film supply or to unload the collection magazine the door switch is depressed and the various film storage drawers can be removed for replacement.

The sequence of operation of the various components of the apparatus shown in FIGS. 8–15 is governed by suitable penumatic and electrical control circuits which are supported on the apparatus. These controls may be of any suitable organization which will accomplish the functions described and accordingly the controls are not shown or described in detail.

Although the invention has been described in its preferred forms with a certain degree of particularity, it is understood that the present disclosure of the preferred forms has been made only by way of example and that numerous changes in the details of the constructions and the combinations and arrangements of parts may be resorted to without departing from the spirit and the scope of the invention as hereinafter claimed.

What is claimed is:

1. In an X-ray device, a radiographic exposure station assembly comprising:
   a. a pair of intensifying screens defining an exposure station therebetween and each having a surface for engaging a piece of radiographic film positioned in the station;
   b. screen positioning mechanism connected to the screens and adapted to move the screens relatively from a film engaging exposure position to a spaced film handling position, the film handling position permitting film to be inserted into and removed from the exposure station; and,
   c. evacuating means for evacuating the exposure station while ambient air pressure external of the station is substantially unaffected whereby the ambient air pressure will force the screen surfaces into tight intimate engagement with a piece of film positioned in the exposure station when the station is evacuated.

2. The assembly of claim 1 wherein the evacuating means includes a manifold adjacent the exposure station and in fluid communication with the space between said surfaces.

3. The assembly of claim 2 wherein the manifold extends along a plurality of sides of the exposure station.

4. The assembly of claim 3 wherein the manifold extends along three sides of the exposure station.

5. The assembly of claim 2 wherein the manifold is in the shape of a square U around three sides of the exposure station.

6. The assembly of claim 2 wherein a plurality of spaced apertures establish fluid communication between the manifold and the exposure station.

7. An X-ray table comprising:
   a. a body;
   b. a patient support surface carried by the body;
   c. an X-ray source supported on one side of said surface;
   d. structure supported on the other side of said surface including film engaging surfaces defining an exposure station for receiving a piece of X-ray film in the station between the film engaging surfaces;
   e. film supply means for carrying a supply of cut film pieces;
   f. an exposed film receiver;
   g. a film transport conveyor means for stripping a single sheet of film from said film supply means transporting the film sheet to the exposure station, and transporting an exposed film sheet from the exposure station to the receiver;
   h. vacuum evacuable clamping means at said exposure station for evacuating the space between said film engaging surfaces to establish pressure differential forces for clamping a sheet of film in the exposure station; and
   i. control means for actuating said clamping means to clamp a sheet of film between the film engaging surfaces for exposure and thereafter to release such clamping to permit removal of the exposed film sheet.

8. The apparatus of claim 7 wherein:
   a. said structure includes a pair of intensifying screens defining said film engaging surfaces; and,
   b. said clamping means includes screen positioning mechanism connected to the screens and adapted to move the screens relatively from a film engaging exposure position to a spaced film handling position, the film handling position permitting film to be inserted into and removed from the exposure station.

9. The assembly of claim 8 wherein the clamping means includes a manifold adjacent the exposure station and in fluid communication with the space between said surfaces.

10. The apparatus of claim 7 wherein:
    a. said film supply means includes a plurality of film supply magazines each for carrying a supply of cut film pieces of uniform size, the film pieces in one magazine being of a different size than the pieces in another magazine;
    b. said film transport conveyor means being operable to strip a single sheet of film of a selected size from a selected magazine; and,
    c. said control means additionally being operable to energize said conveyor means to select a desired film size.

11. The apparatus of claim 10 wherein:
    a. said patient support surface is horizontal;
    b. said X-ray source is supported over the patient support surface;
    c. said exposure station is defined beneath the patient support surface;
    d. said magazines are carried beneath said patient support surface; and
    e. the film pieces in said magazines are canted at angles between horizontal and vertical and are positioned below a path of film transport between the station and the receiver whereby the patient surface is at a conveniently low height and the film can be transported at least partially along a common path when going to and coming from the station.

12. The table of claim 11 wherein the magazines are arranged in parallel relationship such that the film pieces in the magazines are substantially parallel.

13. The table of claim 11 wherein the X-ray source and the station are movable along paths paralleling the patient surface and wherein the control means automatically moves the source and station relatively along such paths for automatically centering an axis of an X-ray beam emitted by the tube with respect to a selected film positioned in the station.

14. An X-ray table comprising:
    a. a body;
    b. a patient supporting surface carried by the body;
    c. an X-ray tube;
    d. a column for supporting the X-ray tube over the patient surface;
    e. structure defining an exposure station in the body and beneath the patient surface for receiving a piece of X-ray film and clamping it in the station between the film engaging surfaces;
    f. the exposure station structure including:
       1. a pair of intensifying screens defining the station therebetween and each having a planar surface for engaging a piece of radiographic film positioned in the station;

2. screen positioning mechanism connected to the screens and adapted to move the two relatively from a film engaging exposure position to a spaced film handling position, the film handling position permitting film to be inserted into and removed from the station; and, 3. evacuating means for evacuating the station while ambient air pressure external of the station is substantially unaffected whereby the ambient air will force the screen surfaces into tight intimate engagement with a piece of film positioned in the station;

g. a plurality of film supply magazines in the body each for carrying a supply of cut film pieces of uniform size, the film pieces in one magazine being of a size different than the pieces in another magazine;

h. an exposed film receiver;

i. a film transport conveyor means for stripping a single sheet of film of a selected size from a selected magazine, transporting the film to the station and transporting an exposed film from the station to the receiver; and, j. control means for:
1. energizing the conveyor means to select a desired film size and perform its transport functions from the magazine to the station and thereafter to the receiver; and,
2. actuating the screen positioning mechanism to clamp a sheet of film for exposure and thereafter to release the clamping for removal of an exposed piece of film.

15. A medical examination X-ray table comprising:
a. a body;
b. a patient support surface mounted on the body;
c. an X-ray tube supporting column and an X-ray tube carried by the column over the surface;
d. an exposure station defining structure beneath the table top and including a pair of clampable members at least one of which is an intensifying screen;
e. a plurality of magazines for individual sheets of cut film positioned in the table body, each magazine being at an angle between the horizontal and vertical such that an upper outlet end of each magazine is canted toward the exposure station;
f. film transport conveyors extending from each of the magazines upwardly to a film transport path;
g. further conveyors establishing a horizontal film transport path with the path being between the table support and the magazines;
h. certain of the conveyors including deflector means to deflect an unexposed sheet of film transported upwardly by the film transport conveyors into said horizontal path whereby said further conveyor can convey the film to the exposure station; and, i. said deflector means permitting an exposed sheet of film on return travel along the path to pass over the magazines and thence to an exposed film receiver.

16. An X-ray table comprising:
a. a body;
b. a patient supporting surface carried by the body;
c. an X-ray tube;
d. a column for supporting the X-ray tube over the patient surface;
e. structure including film engaging surfaces defining an exposure station in the body and beneath the patient surface for receiving a piece of X-ray film and clamping it in the station between the film engaging surfaces;
f. a plurality of film supply magazines in the body each for carrying a supply of cut film pieces of uniform size, the film pieces in one magazine being of a size different than the pieces in another magazine;
g. an exposed film receiver;
h. a film transport conveyor means for stripping a single sheet of film of a selected size from a selected magazine, transporting the film to the station and transporting an exposed film from the station to the receiver; and,
i. control means for:
1. energizing the conveyor means to select a desired film size and perform its transport functions from the magazine to the station and thereafter to the receiver; and,
2. actuating a clamping mechanism to clamp a sheet of film between the film engaging surfaces for exposure and thereafter to release the clamping for removal of an exposed piece of film.

17. The table of claim 16 wherein the patient surface is horizontal and wherein the film pieces in the magazines are canted at angles between horizontal and vertical and below a path of film transport between the station and the receiver whereby the patient surface is at a conveniently low height and the film can be transported at least partially along a common path when going to and coming from the station.

18. The table of claim 17 wherein the magazines are parallel such that the film pieces in the magazines are substantially parallel.

19. The table of claim 16 wherein at least a selected one of the X-ray tube and the station is movable along a path paralleling the patient surface and wherein the control means automatically moves the tube and station relatively along the path whereby an axis of an X-ray beam emitted by the tube will be substantially centered automatically with respect to a selected film.

20. The apparatus of claim 16 wherein the patient surface is horizontal and wherein the film magazines are canted at angles between horizontal and vertical, said magazines being located below a path of film transport between the station and the receiver.

21. The apparatus of claim 20 wherein the film magazines are arranged parallel to each other such that the film pieces in the magazines are substantially parallel.

* * * * *